(12) United States Patent
Yamamoto et al.

(10) Patent No.: US 12,022,466 B2
(45) Date of Patent: Jun. 25, 2024

(54) TERMINAL AND COMMUNICATION METHOD FOR ALLOCATING UPLINK RESOURCES

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP); Lilei Wang, Beijing (CN); Hongchao Li, Hessen (DE); Ankit Bhamri, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 82 days.

(21) Appl. No.: 17/255,910

(22) PCT Filed: Sep. 27, 2018

(86) PCT No.: PCT/CN2018/107947
§ 371 (c)(1),
(2) Date: Dec. 23, 2020

(87) PCT Pub. No.: WO2020/061900
PCT Pub. Date: Apr. 2, 2020

(65) Prior Publication Data
US 2021/0274531 A1  Sep. 2, 2021

(51) Int. Cl.
*H04W 72/21* (2023.01)
*H04L 1/00* (2006.01)
(Continued)

(52) U.S. Cl.
CPC ........... *H04W 72/21* (2023.01); *H04L 1/0004* (2013.01); *H04W 72/0446* (2013.01); *H04W 72/0453* (2013.01); *H04W 72/535* (2023.01)

(58) Field of Classification Search
CPC ......... H04W 72/1284; H04W 72/0446; H04W 72/0453; H04W 72/1257; H04L 1/0004
See application file for complete search history.

(56) References Cited

U.S. PATENT DOCUMENTS 11,234,218 B2 * 1/2022 Sun .................. H04W 72/1284
2017/0048857 A1 * 2/2017 Vajapeyam ........... H04W 72/14
(Continued)

FOREIGN PATENT DOCUMENTS

| WO | 2016/017327 A1 | 2/2016 |
|---|---|---|
| WO | 2017/131861 A1 | 8/2017 |
| WO | 2017/172937 A1 | 10/2017 |

OTHER PUBLICATIONS

3GPP TS 38.211 V15.2.0, "3rd Generation Partnership Project; Technical Specification Group Radio Access Network; NR; Physical channels and modulation (Release 15)," Jun. 2018, 96 pages.
(Continued)

*Primary Examiner* — Michael Thier
*Assistant Examiner* — Nevena Zecevic Sandhu
(74) *Attorney, Agent, or Firm* — Seed IP Law Group LLP

(57) ABSTRACT

In a terminal (200), a controller (209) dynamically determines one or more parameters relating to transmission of uplink data. A transmitter (216) transmits uplink control information indicating the determined one or more parameters to a base station.

15 Claims, 11 Drawing Sheets

(51) Int. Cl.
*H04W 72/0446* (2023.01)
*H04W 72/0453* (2023.01)
*H04W 72/50* (2023.01)

(56) References Cited

U.S. PATENT DOCUMENTS

| | | | |
|---|---|---|---|
| 2017/0265225 A1 | 9/2017 | Takeda et al. | |
| 2017/0347270 A1* | 11/2017 | Iouchi | H04W 72/0446 |
| 2018/0278371 A1* | 9/2018 | Chien | H04L 1/0009 |
| 2018/0279293 A1* | 9/2018 | Harrison | H04L 5/0057 |
| 2018/0352563 A1* | 12/2018 | Liu | H04L 1/1887 |
| 2020/0136750 A1* | 4/2020 | Baldemair | H04L 1/1812 |
| 2020/0267709 A1* | 8/2020 | Feng | H04L 1/1812 |
| 2021/0168007 A1* | 6/2021 | Shao | H04L 5/0094 |
| 2021/0307036 A1* | 9/2021 | Myung | H04L 5/0053 |
| 2021/0368494 A1* | 11/2021 | Chen | H04L 1/0038 |

OTHER PUBLICATIONS

3GPP TS 38.212 V15.2.0, "3rd Generation Partnership Project; Technical Specification Group Radio Access Network; NR; Multiplexing and channel coding (Release 15)," Jun. 2018, 98 pages.

3GPP TS 38.213 V15.2.0, "3rd Generation Partnership Project; Technical Specification Group Radio Access Network; NR; Physical layer procedures for control (Release 15)," Jun. 2018, 99 pages.

3GPP TS 38.214 V15.2.0, "3rd Generation Partnership Project; Technical Specification Group Radio Access Network; NR; Physical layer procedures for data (Release 15)," Jun. 2018, 95 pages.

Huawei, HiSilicon, "Transmission with configured grant in NR unlicensed band," R1-1808064, Agenda Item: 7.2.2.4.4, 3GPP TSG RAN WG1 Meeting #94, Gothenburg, Sweden, Aug. 20-24, 2018, 7 pages.

International Search Report, mailed Jul. 2, 2019, for corresponding International Application No. PCT/CN2018/107947, 2 pages.

* cited by examiner

| UCI bit | TBS | Number of Symbols | Frequency Resource |
|---|---|---|---|
| 0 | X(1) | Y(1) | Z(1) |
| 1 | X(2) | Y(2) | Z(2) |
| 2 | X(3) | Y(3) | Z(3) |
| ⋮ | ⋮ | ⋮ | ⋮ |
| M | $X(N_X-1)$ | $Y(N_Y-1)$ | $Z(N_Z-1)$ |

FIG. 5

| UCI bit | Configuration ID | TBS or MCS | Number of Symbols | Frequency Resource |
|---|---|---|---|---|
| 0 | 0 | X(1) | Y(1) | Z(1) |
| 1 | 1 | X(2) | Y(2) | Z(2) |
| 2 | 2 | X(3) | Y(3) | Z(3) |
| ⋮ | ⋮ | ⋮ | ⋮ | ⋮ |
| M | M | $X(N_X-1)$ | $Y(N_Y-1)$ | $Z(N_Z-1)$ |

FIG. 6

| UCI bit | Configuration ID | Priority Level | TBS or MCS | Number of Symbols | Frequency Resource |
|---------|------------------|----------------|------------|-------------------|--------------------|
| 0 | 0 | High | $X(1)$ | $Y(1)$ | $Z(1)$ |
| 1 | 1 | High | $X(2)$ | $Y(2)$ | $Z(2)$ |
| 2 | 2 | Low | $X(3)$ | $Y(3)$ | $Z(3)$ |
| ⋮ | ⋮ | ⋮ | ⋮ | ⋮ | ⋮ |
| M | M | Low | $X(N_X-1)$ | $Y(N_Y-1)$ | $Z(N_Z-1)$ |

FIG. 8

TERMINAL AND COMMUNICATION METHOD FOR ALLOCATING UPLINK RESOURCES

TECHNICAL FIELD

The present disclosure relates to a terminal and a communication method.

BACKGROUND ART

In the 3rd generation partnership project (3GPP), the standardization of specification of Release 15 New Radio access technology (NR) has been completed for achieving the $5^{th}$ Generation mobile communication systems (5G). NR supports functionalities to achieve Ultra Reliable and Low Latency Communication (URLLC) together with high speed and large capacity, which are basic requirements for enhanced Mobile Broadband (eMBB) (e.g., see Non-Patent Literatures (hereinafter, referred to as "NPLs") 1 to 4).

CITATION LIST

Non-Patent Literature

NPL 1
  3GPP TS 38.211 V15.2.0, "NR; Physical channels and modulation (Release 15)," June 2018
NPL 2
  3GPP TS 38.212 V15.2.0, "NR; Multiplexing and channel coding (Release 15)," June 2018
NPL 3
  3GPP TS 38.213 V15.2.0, "NR; Physical layer procedure for control (Release 15)," June 2018
NPL 4
  3GPP TS 38.214 V15.2.0, "NR; Physical layer procedure for control (Release 15)," June 2018

SUMMARY

There has been no sufficient study on uplink signal transmission methods in NR, however.

One non-limiting and exemplary embodiment facilitates providing a terminal and a communication method each capable of appropriately transmitting an uplink signal.

In one general aspect, the techniques disclosed here feature; a terminal, including: control circuitry, which, in operation, dynamically determines one or more parameters relating to transmission of uplink data; and transmission circuitry, which, in operation, transmits, to a base station, uplink control information indicating the determined one or more parameters.

In another general aspect, the techniques disclosed here feature; a communication method, including: dynamically determining one or more parameters relating to transmission of uplink data; and transmitting, to a base station, uplink control information indicating the determined one or more parameters.

It should be noted that general or specific embodiments may be implemented as a system, an apparatus, a method, an integrated circuit, a computer program or a storage medium, or any selective combination of the system, the apparatus, the method, the integrated circuit, the computer program, and the storage medium.

According to an aspect of this disclosure, an uplink signal can be appropriately transmitted.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 5 is a diagram illustrating an example of an association between a UCI and a semi-static configuration according to Embodiment 1;
FIG. 6 is a diagram illustrating an example of an association between a UCI and a configuration ID according to Embodiment 2;
FIG. 8 is a diagram illustrating an example of an association between a UCI and a semi-static configuration according to Embodiment 3.

DESCRIPTION OF EMBODIMENTS

Figure 1:
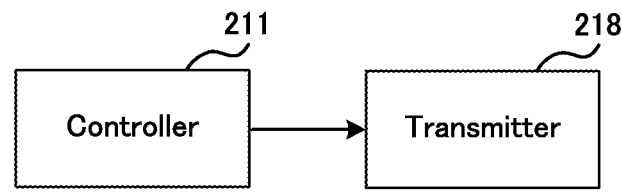
FIG. 1 is a block diagram illustrating a configuration of a part of a terminal according to Embodiment 1.

Hereinafter, a detailed description will be given of embodiments of the present disclosure with reference to the accompanying drawings.

Release 15 supports, as one of the functionalities for URLLC, "grant-free transmission" (or referred to as "configured grant transmission") for transmission of uplink (hereinafter, referred to as "UL") data (e.g., Physical Uplink Shared Channel (PUSCH)).

UL grant-free transmission includes "Type 1 PUSCH transmission using a configured grant" and "Type 2 PUSCH transmission using a configured grant."

In Type 1 PUSCH transmission using a configured grant, for example, a Modulation and Coding Scheme (MCS), and radio resource allocation information (e.g., time resource or frequency resource allocation) are configured by a UE-specific higher-layer signal (e.g., Radio Resource Control (RRC)). When a UL packet occurs, a terminal (User Equipment (UE)) transmits a PUSCH without any UL grant from a base station (gNB) (in other words, without dynamic allocation), using the previously configured MCS and radio resource.

Type 2 PUSCH transmission using a configured grant is activated or deactivated by downlink (hereinafter, referred to as "DL") control information (e.g., Downlink Control Information (DCI)) from a base station. Moreover, in Type 2 PUSCH transmission using a configured grant, an MCS and radio resource allocation information are configured by a DCI for activation (hereinafter, referred to as "activation DCI"). When a UL packet occurs, a terminal transmits a PUSCH, semi-persistently using the MCS and radio resource which have been configured by activation DCI (in other words, without dynamic allocation).

The requirement for URLLC in Release 15 NR is to achieve an air interface latency of not greater than 1 ms and reliability of 99.999% for transmission of a 32-byte packet. Meanwhile, in Release 16 or future URLLC, extension of use-cases of URLLC is expected, and handling of a larger data size (e.g., 256 bytes or the like) may be required. Moreover, it is expected that the size of UL data transmitted from a terminal differs depending on use-cases or traffic of URLLC (e.g., between 32 bytes and 256 bytes).

Meanwhile, in UL grant-free transmission of Release 15 NR, the configuration of an MCS or a radio resource is, for example, a semi-static configuration by a higher-layer signal or a semi-persistent configuration by an activation DCI. Moreover, in Release 15 NR, a data size (e.g., Transport Block Size (TBS)) is computed, for example, from an MCS or a radio resource amount. For this reason, in UL grant-free transmission of Release 15 NR, when the UL data traffic amount of a terminal or the requirement for UL data changes dynamically, a different data size (e.g., TBS) cannot be sufficiently handled.

Moreover, for example, when an MCS or a radio resource (in other words, data size) is configured in accordance with the maximum data traffic amount expected as data transmission by a terminal, there is a case where a large amount of radio resources is reserved for UL grant-free transmission. However, reserving a large amount of resources for grant-free transmission not frequently performed relatively, such as a case where the traffic of URLLC is intermittent and/or the like, involves a concern for increasing overhead and thus degrading the resource utilization efficiency.

In this respect, an aspect of the present disclosure describes a method for a terminal to dynamically determine a resource in grant-free transmission in a case where a UL data traffic amount or a UL data requirement changes dynamically.

Hereinafter, each embodiment will be described in detail.

Embodiment 1

[Overview of Communication System]

A communication system according to each embodiment of the present disclosure includes base station 100 and terminal 200.

FIG. 1 is block diagram illustrating a configuration of a part of terminal 200 according to each embodiment of the present disclosure. In terminal 200 illustrated in FIG. 1, controller 209 dynamically configures parameters relating to transmission of UL data (e.g., UL grant-free transmission). Transmitter 216 transmits UL control information (e.g., UCI) indicating the configured parameters to base station 100.

[Configuration of Base Station]

Figure 2:
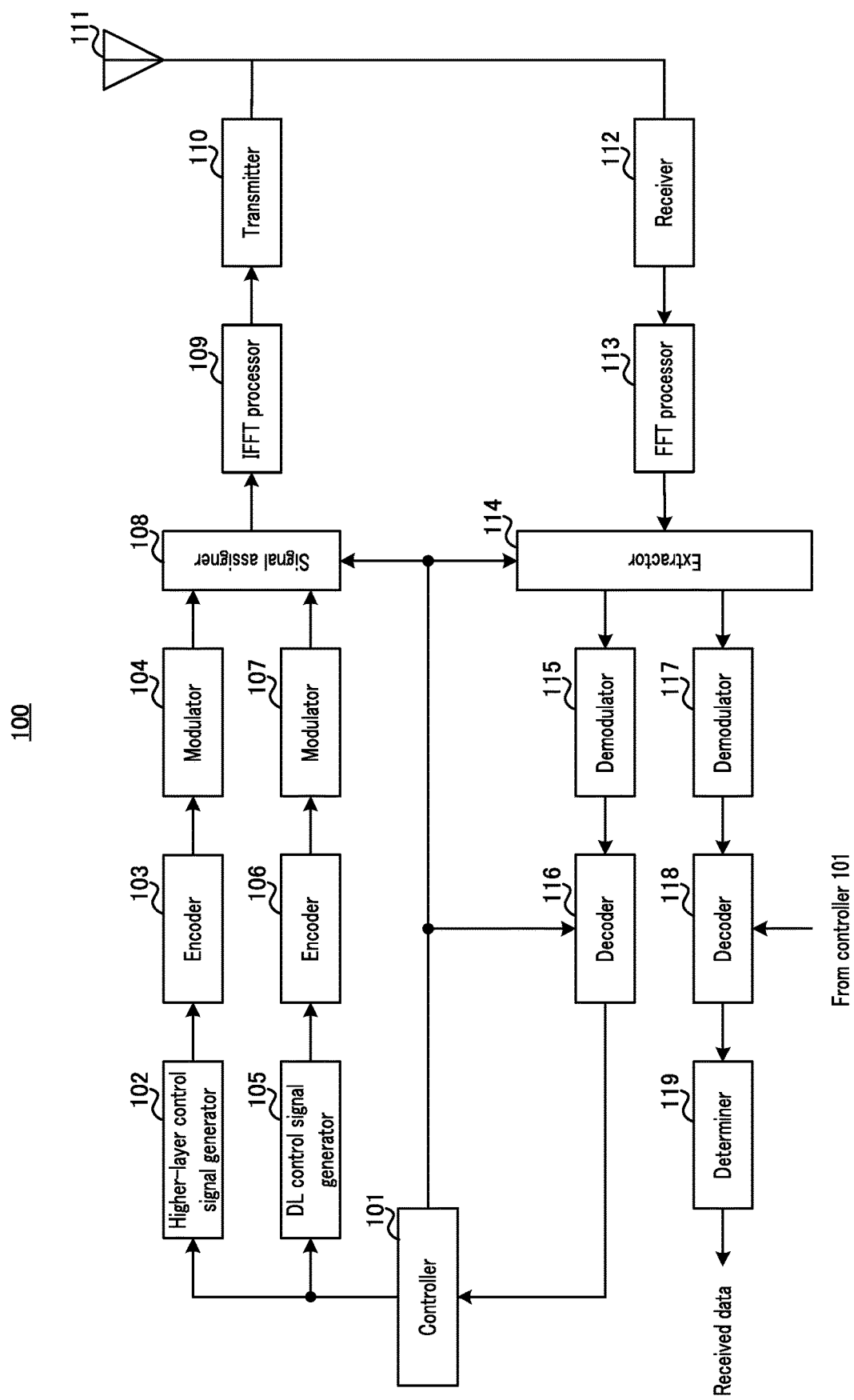
FIG. 2 is a block diagram illustrating a configuration of a base station according to Embodiment 1.

FIG. 2 is a block diagram illustrating a configuration of base station 100 according to Embodiment 1 of the present disclosure. In FIG. 2, base station 100 includes controller 101, higher-layer control signal generator 102, encoder 103, modulator 104, DL control signal generator 105, encoder 106, modulator 107, signal assigner 108, inverse fast Fourier transform (IFFT) processor 109, transmitter 110, antenna 111, receiver 112, fast Fourier transform (FFT) processor 113, extractor 114, demodulator 115, decoder 116, demodulator 117, and determiner 119.

Controller 101 determines information relating to transmission of uplink control information (UCI) for UL grant-free transmission of terminal 200 and outputs the determined information to extractor 114 and decoder 116. The information relating to the transmission of a UCI includes, for example, information relating to "semi-static configuration" (to be described, hereinafter) for UL grant-free transmission or information relating to a UCI transmission method or a resource position and/or the like. Further, controller 101 outputs the determined information to higher-layer control signal generator 102 or DL control signal generator 105.

Moreover, controller 101 determines radio resource allocation for a higher-layer control signal (higher-layer control signal) or a DL control signal for transmitting DL control information and outputs the determined information to signal assigner 108.

Moreover, controller 101 determines information relating to UL grant-free transmission of terminal 200 and outputs the determined information to extractor 114. The information relating to UL grant-free transmission of terminal 200 includes, for example, a transmission period, a transmission timing, or a modulation and coding scheme (e.g., MCS) for a data signal to be transmitted using PUSCH, or the like in grant-free transmission. Furthermore, controller 101 outputs the determined information to higher-layer control signal generator 102 or DL control signal generator 105.

Moreover, controller 101 determines a radio resource portion in which UL data has been transmitted, or information (e.g., TBS or MCS) for decoding UL data, based on the information relating to a parameter for grant-free transmission to be inputted from decoder 116. Controller 101 outputs the determined information to extractor 114 and decoder 118.

Higher-layer control signal generator 102 generates a control information bit sequence (higher-layer control signal), using control information inputted from controller 101, and outputs the generated control information bit sequence to encoder 103.

Encoder 103 applies error correction coding to the control information bit sequence inputted from higher-layer control signal generator 102 and outputs the coded control signal to modulator 104.

Modulator 104 modulates the control signal inputted from encoder 103 and outputs the modulated control signal to signal assigner 108.

DL control signal generator 105 generates a control information bit sequence (DL control signal, such as DCI), using the control information inputted from controller 101, and outputs the generated control information bit sequence to encoder 106. Note that, DL control signal generator 109 may include the terminal ID of each terminal in control information for each terminal when generating the control information because the control information may be transmitted to a plurality of terminals. Note that, a scrambling sequence to be described hereinafter may be used for the terminal ID.

Encoder 106 applies error correction coding to the control information bit sequence inputted from DL control signal generator 105 and outputs the coded control signal to modulator 107.

Modulator 107 modulates the control signal inputted from encoder 106 and outputs the modulated control signal to signal assigner 108.

Signal assigner 108 maps the higher-layer control signal inputted from modulator 104 or the DL control signal inputted from modulator 107 to a radio resource, based on the information indicating a radio resource, which is inputted from controller 101. Signal assigner 108 outputs, to IFFT processor 109, the DL signal in which the signal has been mapped.

IFFT processor 109 applies transmission waveform generation processing, such as Orthogonal Frequency Division Multiplexing (OFDM), to the signal inputted from signal assigner 108. IFFT processor 109 adds a Cyclic Prefix (CP) in case of OFDM transmission in which a CP is to be added (not illustrated). IFFT processor 109 outputs the generated transmission waveform to transmitter 110.

Transmitter 110 applies Radio Frequency (RF) processing, such as Digital-to-Analog (D/A) conversion and/or up-conversion, to the signal inputted from IFFT processor 109, and transmits the radio signal to terminal 200 via antenna 111.

Receiver 112 applies RF processing, such as down-conversion or Analog-to-Digital (A/D) conversion, to the UL signal waveform received from terminal 200 via antenna 111, and outputs the UL signal waveform after the reception processing to FFT processor 113.

FFT processor 113 applies FFT processing for converting a time domain signal to a frequency domain signal to the UL signal waveform inputted from receiver 112. FFT processor 113 outputs the frequency domain signal resulting from the FFT processing to extractor 114.

Extractor 114 extracts, from the signal inputted from FFT processor 113, a radio resource portion in which a UCI has been transmitted, and a radio resource portion in which UL data has been transmitted, based on the information inputted from controller 101. Extractor 114 outputs the radio resource portion in which the extracted UCI has been transmitted to demodulator 115, and outputs the radio resource portion in which the extracted UL data has been transmitted to demodulator 117.

Demodulator 115 applies equalization and demodulation to the radio resource portion corresponding to the UCI and inputted from extractor 114, and outputs the demodulation result (demodulation sequence) to decoder 116.

Decoder 116 applies error correction decoding to the demodulation result inputted from demodulator 115, based on the information inputted from controller 101, and outputs the decoded bit sequence (e.g., including information relating to a parameter for grant-free transmission) to controller 101.

Demodulator 117 applies equalization and demodulation to the radio resource portion corresponding to the UL data and inputted from extractor 114 and outputs the demodulation result (demodulation sequence) to decoder 118.

Decoder 118 applies error correction decoding to the demodulation result inputted from demodulator 117, based on information inputted from controller 101 (e.g., radio resource portion in which UL data has been transmitted, or information for decoding UL data), and outputs the decoded bit sequence to determiner 119.

Determiner 119 performs error detection on the bit sequence inputted from decoder 118, and when no error is detected, determiner 119 acquires the received data. Note that, determiner 119 may generate, using the error detection result, a response signal (ACK/NACK or HARQ-ACK) for retransmission request to terminal 200, and perform retransmission control (not illustrated).

[Configuration of Terminal]

Figure 3:
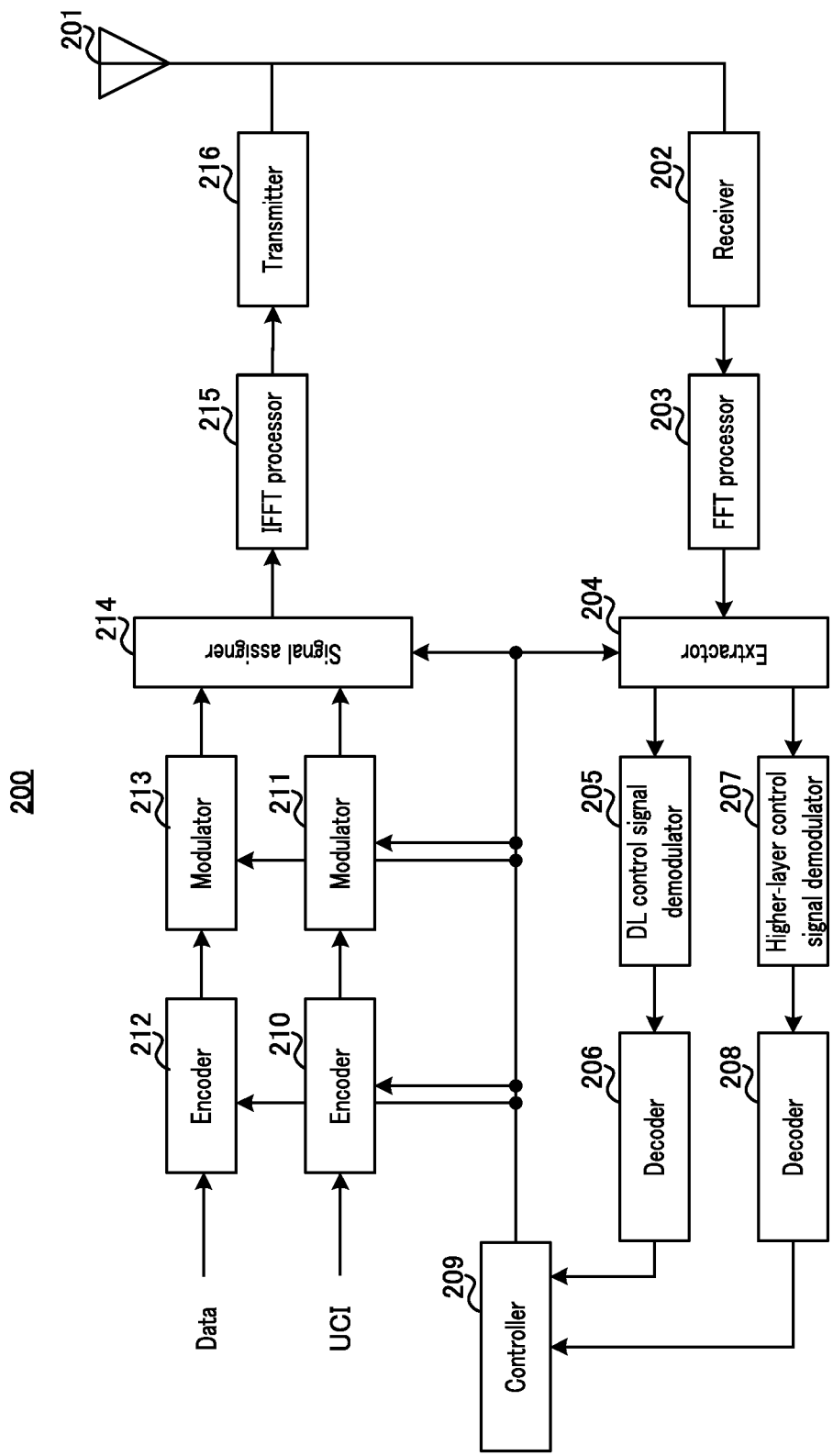
FIG. 3 is a block diagram illustrating a configuration of the terminal according to Embodiment 1.

FIG. 3 is a block diagram illustrating a configuration of terminal 200 according to Embodiment 1 of the present disclosure. In FIG. 3, terminal 200 includes antenna 201, receiver 202, FFT processor 203, extractor 204, DL control signal demodulator 205, decoder 206, higher-layer control signal demodulator 207, decoder 208, controller 209, encoders 210 and 212, modulators 211 and 213, signal assigner 214, IFFT processor 215, and transmitter 216.

Receiver 202 applies RF processing, such as down-conversion or Analog-to-Digital (A/D) conversion, to the signal waveform of a DL signal (data signal or control signal) received from base station 100 via antenna 201, and outputs the resultant received signal (baseband signal) to FFT processor 203.

FFT processor 203 applies, FFT processing for converting a time domain signal to a frequency domain signal, to the signal (time domain signal) inputted from receiver 202. FFT processor 203 outputs the frequency domain signal resulting from the FFT processing to extractor 204.

Extractor 204 extracts a DL control signal (e.g., DCI) or a higher-layer control signal from the signal inputted from FFT processor 203, based on the control information inputted from controller 209 (e.g., information relating to a radio resource for a control signal). Extractor 204 outputs the DL control signal to DL control signal demodulator 205 and outputs the higher-layer control signal to higher-layer control signal demodulator 207.

DL control signal demodulator 205 applies equalization and demodulation to the DL control signal inputted from extractor 204 and outputs the demodulation result to decoder 206.

Decoder 206 applies error correction decoding using the demodulation result inputted from DL control signal demodulator 205 to acquire control information. Decoder 206 outputs the acquired control information to controller 209.

Higher-layer control signal demodulator 207 applies equalization and demodulation to the higher-layer control signal inputted from extractor 204 and outputs the demodulation result to decoder 208.

Decoder 208 applies error correction decoding using the demodulation result inputted from higher-layer control signal demodulator 207 to acquire control information. Decoder 208 outputs the acquired control information to controller 209.

Controller 209 determines a transmission method or a parameter (e.g., MCS or radio resource and/or the like) in UL transmission (e.g., UCI or UL data) based on information relating to UCI transmission of terminal 200 or information relating to UL grant-free transmission included in the control information inputted from decoder 206 or decoder 208. Controller 209 outputs the determined information to encoders 210 and 212, modulators 211 and 213, and signal assigner 214.

Further, controller 209 outputs the information relating to a radio resource for a control signal, which is included in the control information inputted from decoder 206 or decoder 208.

Encoder 210 applies error correction coding to a UCI (e.g., UCI sequence) based on the information inputted from controller 209 and outputs the coded UCI (bit sequence) to modulator 211.

Modulator 211 modulates the UCI inputted from encoder 210, based on the information inputted from controller 209, and outputs the modulated UCI (modulation symbol sequence) to signal assigner 214.

Encoder 212 applies error correction coding to UL data (transmission bit sequence) based on the information inputted from controller 209 and outputs the coded UL data (bit sequence) to modulator 213.

Modulator 213 modulates the UL data inputted from encoder 212, based on the information inputted from controller 209, and outputs the modulated UL data (modulation symbol sequence) to signal assigner 214.

Signal assigner 214 maps the UCI (modulation symbol sequence) inputted from modulator 211 to a radio resource indicated by controller 209. Further, signal assigner 214 maps the UL data (modulation symbol sequence) inputted from modulator 213 to the radio resource indicated by controller 209. Signal assigner 214 outputs, to IFFT processor 215, a signal to which the UCI or the UL data has been mapped.

IFFT processor 215 applies transmission waveform generation processing, such as OFDM, to the signal inputted from signal assigner 214. IFFT processor 215 adds a Cyclic Prefix (CP) in case of OFDM transmission in which a CP is to be added (not illustrated). Alternatively, in a case where IFFT processor 215 is to generate a single carrier waveform, a Discrete Fourier Transform (DFT) processor may be added to a layer before signal assigner 214 (not illustrated). IFFT processor 215 outputs the generated transmission waveform to transmitter 216.

Transmitter 216 applies Radio Frequency (RF) processing, such as Digital-to-Analog (D/A) conversion and/or up-conversion, to the signal inputted from IFFT processor 215, and transmits the radio signal to base station 100 via antenna 201.

[Operations of Base Station 100 and Terminal 200]

Operations of base station 100 and terminal 200 having the configurations described above will be described in detail, hereinafter.

The larger the number of data size (e.g., TBS) candidates which can be selected by a terminal, the more flexible UL grant-free transmission can be performed in accordance with data traffic amounts.

Likewise, the finer the granularity of radio resource allocation which can be selected by a terminal, the more flexible UL grant-free transmission can be performed in accordance with data traffic amounts.

In a case where a terminal flexibly configures a parameter, such as TBS or a radio resource in UL grant-free transmission, the overhead for a UCI to be indicated to a base station from the terminal increases, however. Further, there arises a concern that reception processing of a base station becomes complicated when the number of parameters (e.g., TB sizes or radio resource candidates) for UL grant-free transmission increases.

In this respect, terminal 200 dynamically determines a parameter (e.g., TBS or radio resource) relating to UL grant-free transmission in this embodiment. Further, terminal 200 indicates, to base station 100, the UCI including an index (identification information) indicating the determined parameter.

Base station 100 indicates, to terminal 200, combinations of a plurality of parameters (hereinafter, e.g., may be referred to as "semi-static configuration") via a higher-layer signal or an activation DCI, for example, for a parameter configuration for TBS or radio resource and/or the like for UL grant-free transmission.

Terminal 200 selects one combination from among the combinations of the plurality of parameters (in other words, candidate parameters), and performs UL grant-free transmission, using the parameters corresponding to the selected combination. Further, terminal 200 indicates, to base station 100, using a UCI (e.g., several bits), identification information (e.g., index) indicating the selected combination of parameters.

Figure 4:
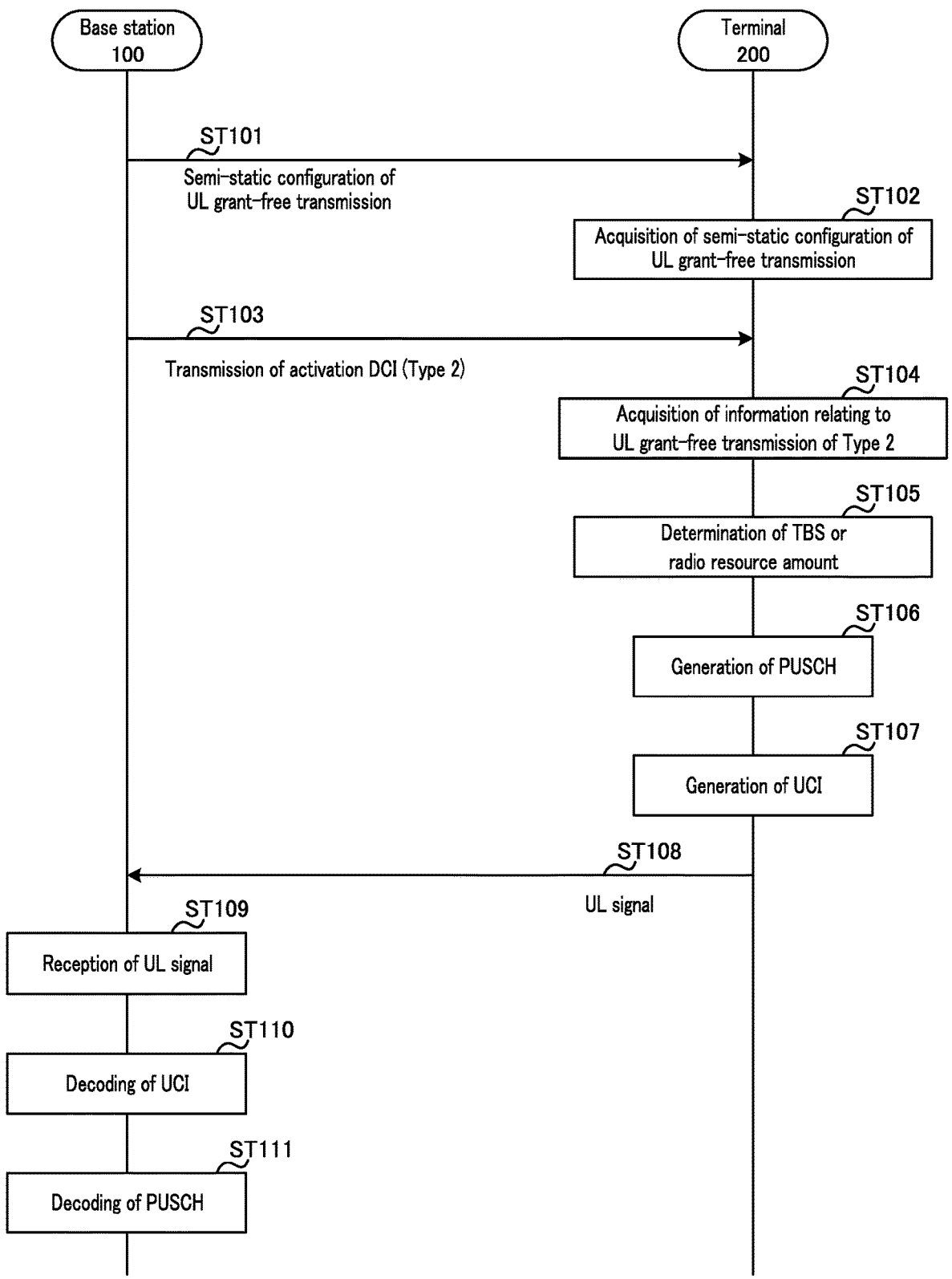
FIG. 4 is a sequence diagram illustrating processing of the base station and the terminal according to Embodiment 1.

FIG. 4 illustrates a processing flow of base station 100 and terminal 200 according to the present embodiment.

Base station 100 indicates, to terminal 200, a semi-static configuration of UL grant-free transmission, for example, using UE-specific higher-layer indication or activation DCI indication (ST101 or ST103).

The parameters forming a semi-static configuration of UL grant-free transmission include, for example, as illustrated in FIG. 5, information relating to TBS $\{X(1), X(2), \ldots, X(N_x-1)\}$ or information relating to radio resource allocation. The information relating to radio resource allocation includes, for example, information relating to time resource allocation (e.g., the number of allocated symbols) $\{Y(1), Y(2), \ldots, Y(N_y-1)\}$ or information relating to frequency resource allocation (e.g., PRB position and the number of allocated PRBs) $\{Z(1), Z(2), \ldots, Z(N_z-1)\}$ and/or the like.

Note that, the parameters forming a semi-static configuration are not limited to the combination illustrated in FIG. 5, and may be different parameters. Further, the information relating to radio resource allocation may include both or any one of the information relating to time resource allocation and the information relating to frequency resource allocation.

Moreover, base station 100 indicates, for example, as illustrated in FIG. 5, an association between a UCI bit and a semi-static configuration of the UL grant-free transmission to terminal 200. In the association illustrated in FIG. 5, an index (e.g., any one of 0 to M) represented by a UCI bit is associated with each combination of parameters forming a semi-static configuration.

Terminal 200 acquires information relating to a semi-static configuration of UL grant-free transmission configured by base station 100 (e.g., information illustrated in FIG. 5) (ST102 or ST104). Thus, the information relating to a semi-static configuration of UL grant-free transmission is shared between base station 100 and terminal 200.

In FIG. 4, in case of Type 2 PUSCH transmission, for example, base station 100 transmits an activation DCI to terminal 200 (ST103). Terminal 200 acquires the activation DCI (ST104) and identifies the information relating to transmission of UL data. Note that, in case of Type 1 PUSCH transmission, instead of processing of ST103 and ST104 illustrated in FIG. 4, terminal 200 is configured with MCS and radio resource allocation information and/or the like, for example, by a UE-specific higher-layer signal (not illustrated).

When a UL packet occurs in terminal 200, terminal 200 selects (determines) (ST105) in accordance with the traffic amount of UL data (e.g., data amount included in buffer or the like), one combination of parameters to be actually used from among the combinations of the plurality of parameters (e.g., combinations of TB sizes and radio resource amounts) included in the semi-static configuration of UL grant-free transmission, which have been acquired in ST102.

Terminal 200 generates UL data (PUSCH) (ST106) based on the parameters corresponding to the combination selected in ST105. Moreover, terminal 200 generates, using at least a part of the UCI corresponding UL data (PUSCH), identification information (e.g., any of indices 0 to M illustrated in FIG. 5) indicating the combination of parameters selected in ST105 for UL grant-free transmission (ST107). Note that, the processing order of ST106 and ST107 may be reversed.

Terminal 200 transmits a UL signal including UL data and a UCI to base station 100 (ST108). Base station 100 receives the UL signal (ST109).

Base station 100 decodes the UCI extracted from the received UL signal (ST110). Base station 100 then decodes PUSCH based on the combination of parameters for the UL grant-free transmission, indicated in the decoded UCI (ST111).

As described above, according to the present embodiment, base station 100 previously indicates combinations (semi-static configuration) of parameters for UL grant-free transmission to terminal 200, and terminal 200 selects one combination, for example, in accordance with the data traffic amount of terminal 200, from among the combinations of a plurality of parameters.

Thus, a plurality of combinations of parameters for UL grant-free transmission can be configured for terminal 200 by a higher-layer signal or an activation DCI. Terminal 200 can dynamically configure parameters relating to a TBS or a radio resource to be used in UL grant-free transmission, in accordance with the data traffic amount of terminal 200 (e.g., data size or the like included in buffer of terminal 200). Accordingly, in this embodiment, for example, as compared with grant-free transmission of Release 15, terminal 200 can flexibly configure parameters in accordance with the traffic amount of data to be actually transmitted.

Moreover, terminal 200 indicates, to base station 100, using a UCI, the index indicating the combination of parameters selected from among the combinations of parameters previously configured between base station 100 and terminal 200 (e.g., FIG. 5). Thus, even when terminal 200 flexibly configures the parameters for UL grant-free transmission, an increase in the overhead for a UCI can be suppressed. Moreover, base station 100 can identify the parameters relating to a TBS or a radio resource by the UCI (including an index) indicated from terminal 200. Thus, according to the present embodiment, the UL data transmitted from terminal 200 by UL grant-free transmission can be correctly demodulated and decoded.

Moreover, baes station 100 can perform reception processing of UL grant-free transmission, using any of the combinations (candidates) of parameters previously configured for terminal 200, so that the reception processing of base station 100 can be simplified.

(Variation 1 of Embodiment 1)

In the present embodiment, the information relating to a TBS or the information relating to resource allocation may be an absolute value, or a relative value with respect to a predetermined value.

In case of relative values, for example, as in the case of Release 15 NR, base station 100 previously configures one semi-static configuration or a combination of parameters (predetermined values) for semi-persistent grant-free transmission by a UE-specific higher-layer signal or an activation DCI. Base station 100 then indicates the semi-static configuration of UL grant-free transmission to terminal 200 by UE-specific higher-layer indication or activation DCI indication. At this time, the values of the respective parameters forming the semi-static configuration are each expressed by a difference from each of the parameters (predetermined values) previously configured by base station 100, using a UE-specific higher-layer signal or an activation DCI.

According to Variation 1, base station 100 only needs to indicate a difference from each parameter to terminal 200, and the overhead for indicating the information for UL grant-free transmission, using a higher-layer signal or an activation DCI, can be reduced.

(Variation 2 of Embodiment 1)

In Release 15 NR, a TBS is computed from an MCS or a radio resource amount (e.g., time resource or frequency resource). Thus, as a parameter included in a semi-static configuration, the information relating to a TBS (e.g., see FIG. 5) may be replaced with information relating to an MCS. Note that, a semi-static configuration may include both of the information relating to a TBS and the information relating to an MCS.

(Variation 3 of Embodiment 1)

The parameters forming a semi-static configuration of UL grant-free transmission may include both or any one of the information relating to a TBS and the information relating to a radio resource. In a case where any one of the information relating to a TBS and the information relating to a radio resource is included in a semi-static configuration, for a parameter not included in the semi-static configuration, one value may be semi-statically or semi-persistently configured by base station 100, using a UE-specific higher-layer signal or an activation DCI, as in the case of Release 15.

Embodiment 2

A base station and a terminal according to Embodiment 2 have basic configurations common to base station 100 and terminal 200 according to Embodiment 1, so that a description will be given while FIGS. 2 and 3 are incorporated herein.

In Release 15, only one active grant-free transmission can be configured in one serving cell and bandwidth part. Meanwhile, in Release 16, configuring a plurality of active grant-free transmissions in one serving cell and bandwidth part has been discussed.

When a plurality of active grant-free transmissions can be configured, different MCSes or radio resource allocations can be configured for respective grant-fee transmissions. Thus, an appropriate grant-free transmission can be selected in accordance with the traffic amount of data to be actually transmitted by terminal 200.

In this embodiment, base station 100 can configure a plurality of active grant-free transmissions in one serving cell and bandwidth part for terminal 200.

Base station 100, for example, configures semi-statically or semi-persistently parameters for UL grant-free transmission, using UE-specific higher-layer indication or activation DCI indication.

At this time, base station 100 indicates a parameter configuration for each of the plurality of active grant-free transmissions to terminal 200. For example, a combination of different parameters may be configured for each of the plurality of active grant-free transmissions. The parameters for UL grant-free transmission include, for example, information relating to a TBS, information relating to an MCS, information relating to radio resource allocation, information relating to a transmission period, information relating to the number of repetitions, and/or the like. For example, a TBS, radio resource allocation, or the number of repetitions may be different for each of the plurality of grant-free transmissions.

As illustrated in FIG. 6, for example, base station 100 indicates an association between a UCI bit and a configuration ID corresponding to each configuration of a grant-free transmission to the terminal 200. Thus, the information relating to a plurality of configurations of a plurality of UL grant-free transmissions are shared between base station 100 and terminal 200.

In FIG. 6, for example, the information relating to a TBS or MCS $\{X(1), X(2), \ldots, X(N_X-1)\}$, the information relating to time resource allocation (e.g., the number of allocated symbols) $\{Y(1), Y(2), \ldots, Y(N_Y-1)\}$ and the information relating to frequency resource allocation (e.g., PRB position, and the number of allocated PRBs) $\{Z(1),$ Z(2), . . . , Z($N_Z$−1)} and/or the like are configured, respectively, for a plurality (M+1 transmissions) of grant-free transmissions. Moreover, in FIG. 6, the identification information (configuration ID) corresponding to the configuration of each grant-free transmission and the UCI bit are associated with each other.

Moreover, base station 100 may indicate a semi-static configuration (in other words, a combination of parameters) for each UL grant-free transmission to terminal 200 as in Embodiment 1. The parameters forming a semi-static configuration of UL grant-free transmission may be similar to those of Embodiment 1 (e.g., see FIG. 5), for example. Thus, terminal 200 can more flexibly select parameters in accordance with, for example, the data traffic amount of terminal 200, from among a plurality of configurations of grant-free transmissions, and a combination of a plurality of parameters (semi-static configuration) in each of the configurations. Note that, a semi-static configuration may be common to the configurations of a plurality of grant-free transmissions or a semi-static configuration may vary for each of the configurations of a plurality of grant-free transmissions.

When a UL packet occurs in terminal 200, for example, terminal 200 selects one configuration to be actually used, from among configurations of a plurality of active grant-free transmissions configured by base station 100. For example, terminal 200 selects, in accordance with the traffic amount of UL data (e.g., the amount of data in buffer), one configuration from among configurations of the plurality of active grant-free transmissions configured in terminal 200.

Terminal 200 performs a UL grant-free transmission based on the parameters corresponding to the configuration of selected active grant-free transmission. Moreover, terminal 200 indicates identification information (e.g., configuration ID) (e.g., any of indices 0 to M illustrated in FIG. 6) indicating the configuration of the selected active grant-free transmission to base station 100, using a UCI (e.g., several bits).

Base station 100 identifies the configuration of the grant-free transmission which has been selected by terminal 200, based on the UCI indicated by terminal 200, and demodulates, and decodes the data transmitted by the UL grant-free transmission, based on the identified configuration.

As described above, in the present embodiment, terminal 200 selects a configuration in accordance with, for example, the data traffic amount of terminal 200, from among the configurations of a plurality of UL grant-free transmissions, and then performs the UL grant-free transmission. Thus, according to the present embodiment, terminal 200 can flexibly configure parameters in accordance with the traffic amount of data to be actually transmitted by terminal 200, as compared with as compared with grant-free transmission of Release 15.

Moreover, terminal 200 indicates the identification information (e.g., configuration ID) indicating the selected configuration of a grant-free transmission to base station 100, using a UCI. Thus, base station 100 can easily identify the configuration which has been actually used by terminal 200.

In particular, when the same radio resource is allocated to configurations of a plurality of active grant-free transmissions, it is difficult for base station 100 to distinguish between these configurations from a viewpoint of radio resources. Meanwhile, as in the present embodiment, including, in a UCI, configuration ID to distinguish between the configurations of a plurality of active grant-free transmissions, base station 100 can easily distinguish a configuration to be used by terminal 200 for performing the grant-free transmission.

Note that, the parameters relating to the configuration of UL grant-free transmission to be indicated using a UCI are not limited to configuration IDs. For example, an HARQ process number, the number of repetitions, Redundancy Version (RV), or the repetition number (e.g., information indicating how many repetitions have been performed (the n-th repetition) in repetition transmission may be included. Moreover, as in Embodiment 1, when a semi-static configuration is used, the index indicating the combination of parameters of the semi-static configuration may be included.

(Variation 1 of Embodiment 2)

When the same radio resource is allocated to configurations of a plurality of active grant-free transmissions, it is difficult for base station 100 to distinguish between these configurations from a viewpoint of radio resources. Thus, the distinction by configuration IDs described in this embodiment is effective.

Meanwhile, a different radio resource is allocated for each of configurations of a plurality of active grant-free transmissions (e.g., radio resources orthogonal to each other), base station 100 can distinguish between the configurations of a plurality of active grant-free transmissions from the radio resources in which UL signals have been received, respectively.

Thus, when the same radio resource is allocated to the configurations of a plurality of active grant-free transmissions, for example, terminal 200 may include, in a UCI, the configuration ID indicating the selected configuration, and when a different radio resource is allocated for each of configurations of a plurality of active grant-free transmissions, terminal 200 need not include, in a UCI, the configuration ID indicating the selected configuration. For example, base station 100 indicates, to terminal 200, the information indicating whether or not to include the configuration ID in a UCI, and terminal 200 may determine whether or not to include the configuration ID in the UCI based on the indication from base station 100.

Thus, an increase in overhead in a UCI can be prevented.

(Variation 2 of Embodiment 2)

Base station 100 can allocate the same radio resource in configurations of active grant-free transmissions for different terminals 200. In this case, base station 100 needs to distinguish from which terminal 200 the UL signal has been transmitted.

In Release 15, for example, terminals are distinguished by assigning a different DMRS to each terminal. However, the number of assignable DMRS sequences is limited.

In this respect, for example, terminal 200 may include a terminal ID (e.g., C-RNTI) in the UCI to be indicated to base station 100.

Moreover, terminal 200 may scramble the UCI, using a terminal ID (e.g., C-RNTI). In this case, base station 100 can distinguish the grant-free transmission of terminal 200 to which the same radio resource has been allocated. Thus, the same radio resource can be allocated to more terminals 200.

(Variation 3 of Embodiment 2)

Terminal 200 may transmit UL data, using a plurality of configurations of active grant-free transmissions.

In a case where terminal 200 performs UL grant-free transmissions at a plurality of transmission timings, using repetition, as an example of using a plurality of configurations of active grant-free transmissions, terminal 200 may switch the configuration of an active grant-free transmission for each repetition (in other words, for each of a plurality of transmission timings).

Figure 7:
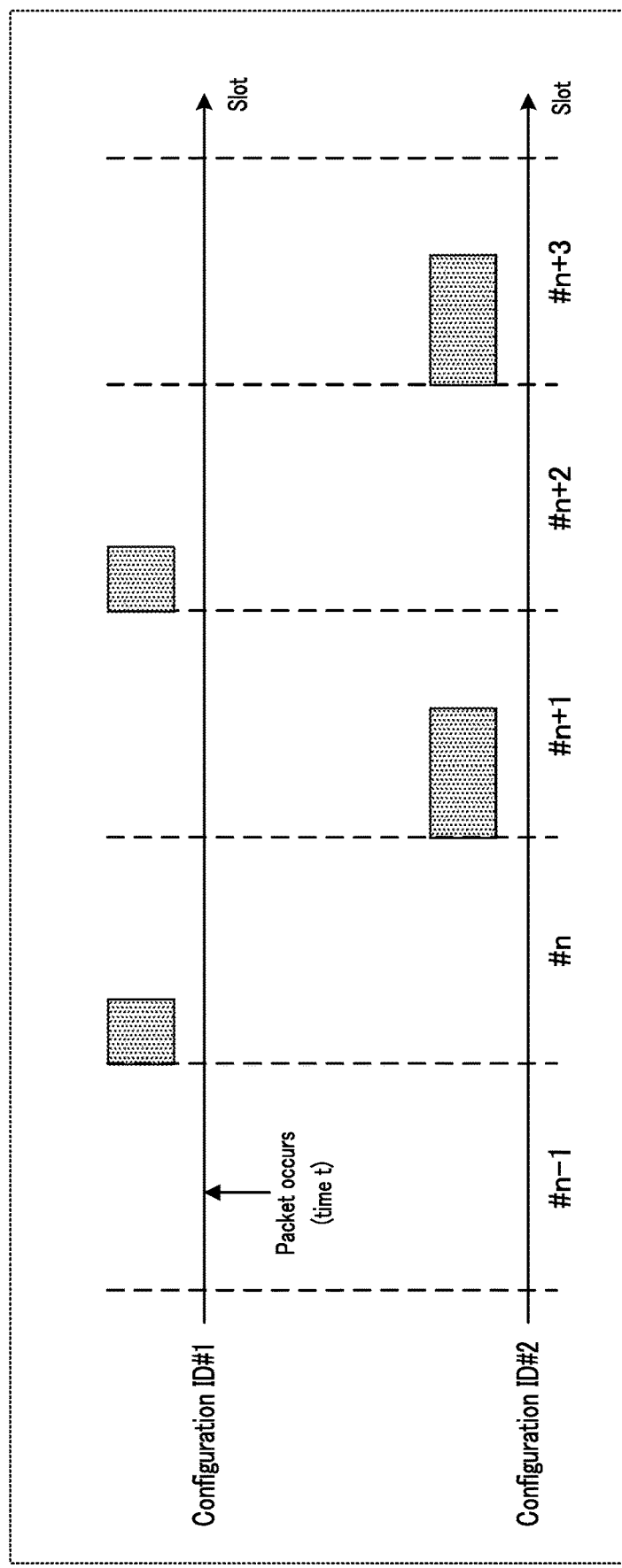
FIG. 7 is a diagram illustrating a transmission example of UCIs according to Variation 3 of Embodiment 2.

As illustrated in FIG. 7, a case will be described where a UL packet occurs at time t and terminal 200 can transmit UL data in slot #n (e.g., time t+n). In FIG. 7, in the configuration for configuration ID #1, an allocation resource amount is small and transmission frequency is high, whereas, in the configuration for configuration ID #2, an allocation resource amount is large and transmission frequency is low.

An assumption is made that the radio resource of configuration ID #1 is allocated to slot #n, and the radio resource of configuration ID #2 is allocated to slot #n+1, for example.

At this time, from a viewpoint of the traffic amount of UL data, for example, even in a case where selecting configuration ID #2 whose resource amount is larger is appropriate, there is a possibility that using configuration ID #1 which allows for transmission at earlier timing be appropriate from a viewpoint of latency. In this case, as illustrated in FIG. 7, for example, terminal 200 may transmit a UL packet, using configuration ID #1 for the initial transmission after occurrence of the UL packet, and switch to configuration ID #2 for the following transmission and perform transmission.

In this manner, grant-free transmission in accordance with the traffic amount of UL data with a reduction in latency in UL data transmission is made possible.

Moreover, terminal 200 may indicate the configuration ID by including, in a UCI, the configuration ID used in each repetition (each transmission timing), to base station 100 in order to allow base station 100 to identify the configuration ID used by terminal 200 in each repetition. For example, in FIG. 7, the UCIs including configuration ID #1, #2, #1, and #2 are indicated in the timings (e.g., slot #n, #n+1, #n+2, #n+3) of repetition transmissions, respectively.

Alternatively, terminal 200 may indicate a pattern of configuration IDs to base station 100 by including, in a UCI, the pattern of configuration IDs respectively used in repetition transmissions (at a plurality of transmission timings). For example, in FIG. 7, a pattern of configuration IDs used in repetition transmissions is {#1, #2, #1, and #2}. For example, terminal 200 may transmit the UCI which includes the pattern of configuration IDs in the initial transmission among a plurality of repetition transmissions.

Note that, the pattern of configuration IDs is not limited to the pattern in which configurations are switched alternatively as illustrated in FIG. 7.

(Variation 4 of Embodiment 2)

In NR, a transport block (TB) may be divided into a plurality of code blocks (CBs) or code block groups (CBGs).

In this case, terminal 200 may transmit different code blocks, using a plurality of configurations of active grant-free transmissions, respectively. In other words, terminal 200 may select any of a plurality of configurations of active grant-free transmissions for each of a plurality of CBs (or CBGs) resulting from division of a TB corresponding to UL data.

A description will be given of an example in which terminal 200 transmits a plurality of CBs (or CBGs), using configurations of a plurality of active grant-free transmissions. For example, in a case where a radio resource amount configured for each of a plurality of active grant-free transmissions is not sufficient for transmission of a single TB, terminal 200 may select any of the configurations of the plurality of active grant-free transmissions for each of the plurality of code blocks forming the single TB. In other words, terminal 200 may combine the radio resources configured respectively for the configurations of a plurality of active grant-free transmissions in transmission of a single TB.

Thus, a sufficient radio resource can be secured for transmission of a single TB.

Embodiment 3

A base station and a terminal according to Embodiment 3 have basic configurations common to base station 100 and terminal 200 according to Embodiment 1, so that a description will be given while FIGS. 2 and 3 are incorporated herein.

In Embodiment 3, as illustrated in FIG. 8, for UL grant-free transmission, information relating to priority of reliability, requirements, or a use-case (service or a traffic type or the like) (priority information) is included in a UCI.

For example, in FIG. 8, for the configuration (any of configuration IDs=0 to M) of each UL grant-free transmission, a high priority (priority level: High) or low priority (priority level: Low) is configured. Note that, although a case where the priority is configured to one of two levels (High or Low) has been described as an example, the priority may be configured to one of three or more levels.

Thus, base station 100 can distinguish between the priorities in accordance with the reliability, requirements, or use-case (service) of each UL data to be transmitted by terminal 200.

For example, a case will be described where configurations of a plurality of active grant-free transmissions are made respectively corresponding to different use-cases (e.g., eMBB and URLLC) and the same radio resource is allocated to the plurality of active grant-free transmissions. In this case, from a viewpoint of radio resources, it is difficult for base station 100 to distinguish between types (use-cases) of these pieces of UL data.

Meanwhile, in this embodiment, a configuration ID and the priority information which allow configurations of the plurality of active grant-free transmissions to be distinguished from each other are included in a UCI. Thus, base station 100 can easily determine which configuration (which priority) to use for performing a grant-free transmission with reference to the priority information included in the UCI.

For example, when performing retransmission after reception of UL data transmitted by UL grant-free transmission, or next scheduling of UL data, base station 100 may utilize the priority information included in the UCI which has been already received from terminal 200. Base station 100 may more preferentially perform scheduling relating to UL transmission with high priority than scheduling relating to other UL transmissions, for example.

Embodiment 4

A base station and a terminal according to Embodiment 4 have basic configurations common to base station 100 and terminal 200 according to Embodiment 1, so that a description will be given while FIGS. 2 and 3 are incorporated herein.

In Embodiment 4, a description will be given of a UCI transmission method and a radio resource to which a UCI is assigned.

In Embodiments 1 to 3, the case has been described where terminal 200 indicates a UCI including parameters relating to a UL grant-free transmission to base station 100. Base station 100 identifies the parameters (e.g., TBS or radio resources) actually used in the UL grant-free transmission in terminal 200, by demodulating and decoding the UCI indicated from terminal 200, and demodulates and decodes the UL data.

Meanwhile, in the UL grant-free transmission mentioned above, the UCI transmission method or the parameters need to be known information between base station 100 and terminal 200.

Hereinafter, two methods (Option 1 and Option 2) as to the UCI transmission method according to this embodiment will be described as an example.

[Option 1]

Option 1 is a method of transmitting a UCI using Physical Uplink Control Channel (PUCCH).

Base station 100 configures terminal 200 with parameters for a UL grant-free transmission semi-statically or semi-persistently, using UE-specific higher-layer indication or activation DCI indication. Alternatively, base station 100 configures the information relating to combinations of a plurality of parameters in terminal 200 by the methods described in Embodiments 1 to 3.

At this time, base station 100 also configures a parameter relating to a PUCCH resource for UCI transmission, using UE-specific higher-layer indication or activation DCI indication. The information relating to a PUCCH format, the information relating to time domain resource allocation, the information relating to frequency domain resource allocation, or the information relating to a code rate, and/or the like are included in the parameter relating to a PUCCH resource, for example.

[Option 2]

Figure 9:
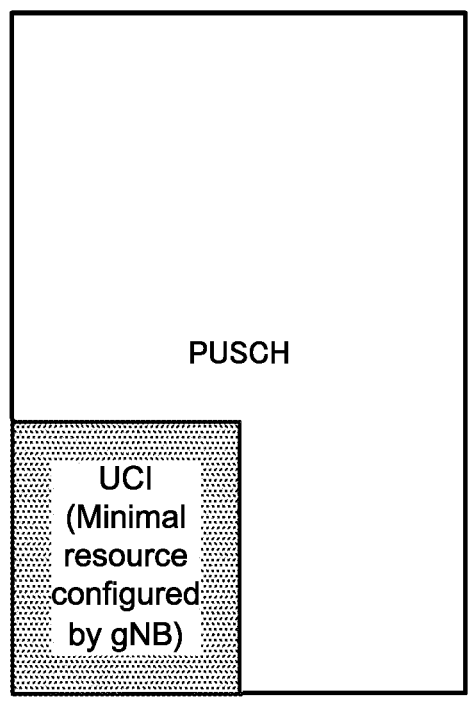
FIG. 9 is a diagram illustrating an example of a UCI transmission method according to Embodiment 4.

Option 2 is a transmission method by multiplexing a UCI on PUSCH for UL grant-free transmission (see, e.g., FIG. 9).

Base station 100 configures terminal 200 with parameters for a UL grant-free transmission semi-statically or semi-persistently, using UE-specific higher-layer indication or activation DCI indication. Alternatively, base station 100 configures the information relating to combinations of a plurality of parameters in terminal 200 by the methods described in Embodiments 1 to 3.

At this time, base station 100 also configures a parameter for multiplexing a UCI onto a PUSCH resource, using UE-specific higher-layer indication or activation DCI indication. The parameter for multiplexing a UCI onto a PUSCH resource includes, for example, information relating to a code rate (e.g., beta offset) (see, e.g., NPL 3) or information relating to a radio resource for mapping the UCI and/or the like. As a parameter for multiplexing a UCI onto a PUSCH resource, a minimal resource for mapping a UCI may be configured by base station 100 (e.g., gNB) as illustrated in FIG. 9, for example.

For the radio resource for mapping a UCI, herein, when a UCI is mapped to the whole radio resource selected by terminal 200, base station 100 cannot know the amount of a radio resource selected by terminal 200 until base station 100 demodulates and decodes the UCI. For this reason, base station 100 cannot correctly demodulate and decode the UCI.

Meanwhile, according to this embodiment, since base station 100 can previously identify the UCI transmission method and the radio resource in which the UCI is transmitted, base station 100 can correctly demodulate and decode the UCI.

Moreover, as described in Variation 1 of Embodiment 1, when base station 100 indicates a relative value of a radio resource to terminal 200, as in the case of Release 15, base station 100 previously configures a combination of parameters for a single semi-static configuration or semi-persistent grant-free transmission, using a UE-specific higher-layer signal or an activation DCI. Further, base station 100 indicates a semi-static configuration of UL grant-free transmission to terminal 200, using UE-specific higher-layer indication or activation DCI indication. At this time, the values of the parameters forming the semi-static configuration are each configured by a difference from the value of each parameter previously configured by base station 100, using a UE-specific higher-layer signal or an activation DCI. In this case, terminal 200 may transmit a UCI, using the parameters corresponding to a single combination previously configured by base station 100, using a UE-specific higher-layer signal or an activation DCI. Thus, the need for base station 100 to indicate additional radio resource allocation information for UCI to terminal 200 is eliminated.

(Variation 1 of Embodiment 4)

In base station 100, it is favorable that a UCI be demodulated and decoded at an early timing as compared with data. In this respect, a UCI may be assigned to a symbol before data. For example, terminal 200 may map a UCI to a symbol subsequent to or after a DMRS symbol. Accordingly, base station 100 can demodulate and decode a UCI earlier.

(Variation 2 of Embodiment 4)

The mapping position of a UCI may vary depending on use-cases.

For example, there is a possibility that grant-free UL transmission NR is utilized in NR using an unlicensed band (may be referred to as "NR-U") or vehicle-to-everything (V2X) communication and/or the like other than URLLC.

In URLLC and NR using an unlicensed band, it is favorable that a UCI be demodulated and decoded earlier in base station 100. In this respect, a UCI may be assigned to a symbol before data in URLLC or NR using an unlicensed band. Thus, a UCI delay can be reduced.

Moreover, securing coverage is important in V2X. In this respect, a UCI may be transmitted using a plurality of symbols while being frequency multiplexed (frequency division multiplexing (FDM)) with data in V2X. Thus, coverage can be expanded.

(Variation 3 of Embodiment 4)

In this embodiment, attention is given to a UCI for indicating parameters used for UL grant-free transmission.

Meanwhile, in NR, a UCI, such as a response signal (ACK/NACK) for DL data or channel state information (CSI) is also transmitted to a base station from a terminal in general. Moreover, in NR, when PUCCH on which a UCI, such as ACK/NACK for DL data or channel state information is transmitted, and grant-free PUSCH are overlapped in time with each other, the UCI, such as ACK/NACK or channel state information, is multiplexed with the grant-free PUSCH.

In this case, the UCI for indicating the parameters used for UL grant-free transmission, and the UCI, such as ACK/NACK or channel state information may be separately multiplexed with a grant-free transmission.

For example, in case of Option 1 above, terminal 200 may transmit a UCI for indicating the parameters used for UL grant-free transmission, via PUCCH, and multiplex a UCI, such as ACK/NACK or channel state information with a grant-free PUSCH and transmit the UCI.

Moreover, for example, in case of Option 2 above, terminal 200 multiplexes the UCI for indicating the parameters used for UL grant-free transmission to a PUSCH resource. Further, terminal 200 may map a UCI, such as ACK/NACK or channel state information to a radio resource different from a radio resource used for the UCI for indicating the parameters used for UL grant-free transmission, on the PUSCH resource.

Embodiment 5

A base station and a terminal according to Embodiment 5 have basic configurations common to base station 100 and terminal 200 according to Embodiment 1, so that a description will be given while FIGS. 2 and 3 are incorporated herein.

In Release 15, repetition transmission can be applied across slots for UL grant-free transmission. Meanwhile, in Release 16, in order to achieve low latency and high-reliability, applying repetition transmission within a slot for UL grant-free transmission has been discussed.

In the present embodiment, the configuration (e.g., the number of repetitions or repetition method) of repetition is made different between a UCI and PUSCH on which data is transmitted.

Figure 10:
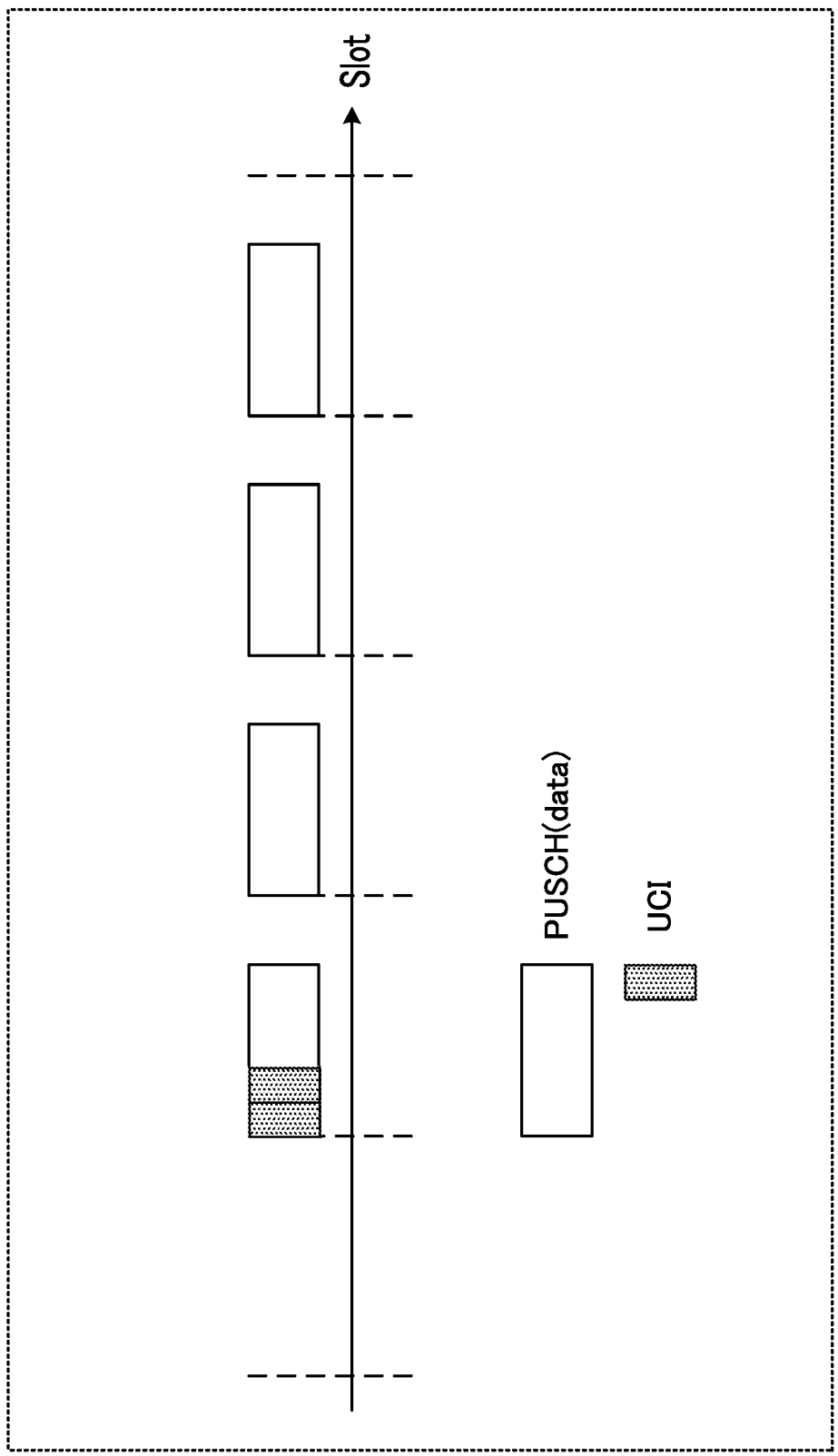
FIG. 10 is a diagram illustrating an example of UCI transmission according to Embodiment 5.

As illustrated in FIG. 10, for example, as for repetition for a UCI, repetition is applied within a slot. Meanwhile, as illustrated in FIG. 10, repetition across slots is applied to PUSCH on which data is transmitted.

Thus, it is made possible to demodulate and decode a UCI in an early stage as compared with PUSCH by repetition within a slot, while the reliability of a UCI is enhanced by repetition.

Embodiment 6

A base station and a terminal according to Embodiment 6 have basic configurations common to base station 100 and terminal 200 according to Embodiment 1, so that a description will be given while FIGS. 2 and 3 are incorporated herein.

In this embodiment, UE-common higher-layer indication (common among terminals) is introduced into a part of a UL grant-free transmission configuration method. For example, the resources configured in terminal 200 for UL grant-free transmission include a resource individually configured for terminal 200 and a resource common to a plurality of terminals including terminal 200.

For example, reserving resources with an assumption of a large amount of data at the time of configuring a combination of a plurality of parameters relating to UL grant-free transmission for a certain terminal may lead to degradation of resource utilization efficiency. In this respect, for example, allocating a resource common to terminals for a resource with an assumption of a large amount of data is also a possibility.

In other words, a resource with an assumption of a small amount of data is individually configured for terminal 200, and a resource with an assumption of a large amount of data is configured in common among terminals.

Thus, the resource utilization efficiency of UL grant-free transmission for a plurality of terminals 200 can be enhanced.

Meanwhile, configuring a resource shared between terminals by UE-specific indication leads to an increase in overhead for a higher-layer signal. In this respect, in this embodiment, a configuration of a resource shared between terminals 200 for UL grant-free transmission is configured by UE-common (or cell-specific) indication. For example, base station 100 configures the radio resource allocation information or the like for UL grant-free transmission, using UE-common higher-layer indication (e.g., such as System Information Block (SIB)).

Thus, the overhead for allocating a resource common to terminals can be reduced.

Note that, the parameters for grant-free transmission to be configured by the UE-common higher-layer indication may be utilized for default configuration (initial configuration) for terminal 200. Further, the configuration of grant-free transmission common to terminals may be associated with a TBS and/or may be associated with a configuration ID.

Moreover, base station 100 may configure the radio resource allocation information for UL grant-free transmission and/or the like, using UE-specific higher-layer indication or activation DCI indication. The configuration method by UE-specific indication is similar to those of Embodiments 1 to 3, for example.

In a case where the same TBS or configuration ID as the configuration of grant-free transmission common to terminals is indicated using UE-specific higher-layer indication or activation DCI indication from base station 100, for example, terminal 200 may override the configuration of grant-free transmission shared by terminals, in accordance with UE-specific indication.

Embodiment 7

A base station and a terminal according to Embodiment 7 have basic configurations common to base station 100 and terminal 200 according to Embodiment 1, so that a description will be given while FIGS. 2 and 3 are incorporated herein.

There is a possibility that UL grant-free transmission be utilized in NR using an unlicensed band (e.g., NR-U) or the like, other than URLLC, for example. In this case, in order to simplify the standard or to simplify a receiver of base station 100, it is desirable to unify the designs of UCIs.

Meanwhile, in URLLC, NR using an unlicensed band, or other use-cases, the information to be indicated to base station 100 from terminal 200 by a UCI and its granularity may be different.

In this respect, in this embodiment, the designs of UCIs for grant-free transmission are unified regardless of URLLC, NR using an licensed band, or other use-cases.

As an example of the design of a UCI, the configurations of a channel on which UCIs are transmitted may be unified. For example, in case of Option 1 of Embodiment 4, the configurations of PUCCH or DMRS designs in grant-free transmission are unified (in other words, the configurations or the designs become the same regardless of use-cases). Moreover, for example, in case of Option 2 of Embodiment 4, the UCI transmission methods (e.g., encoding method and/or the like) or UCI mapping methods to a PUSCH resource in grant-free transmission are unified (in other words, the methods become the same regardless of use-cases).

As an example of the UCI design, UCI sizes (bit sizes) in grant-free transmission may be unified.

Further, in the present embodiment, the information indicated by a UCI and the granularity of the information are made different for each use-case.

For example, in URLLC, there is a possibility that indication of a flexible granularity be required due to frequency-domain resource allocation or the number of repetitions. Meanwhile, in NR using an unlicensed band, there is a possibility that indication of a flexible granularity be required due to a TBS or time-domain resource allocation.

In this respect, in this embodiment, the UCI bit field whose bit sizes are unified is read in accordance with use-cases. In other words, bit allocation of information relating to each parameter in a UCI whose bit sizes are unified is different for each use-case.

Figure 11:
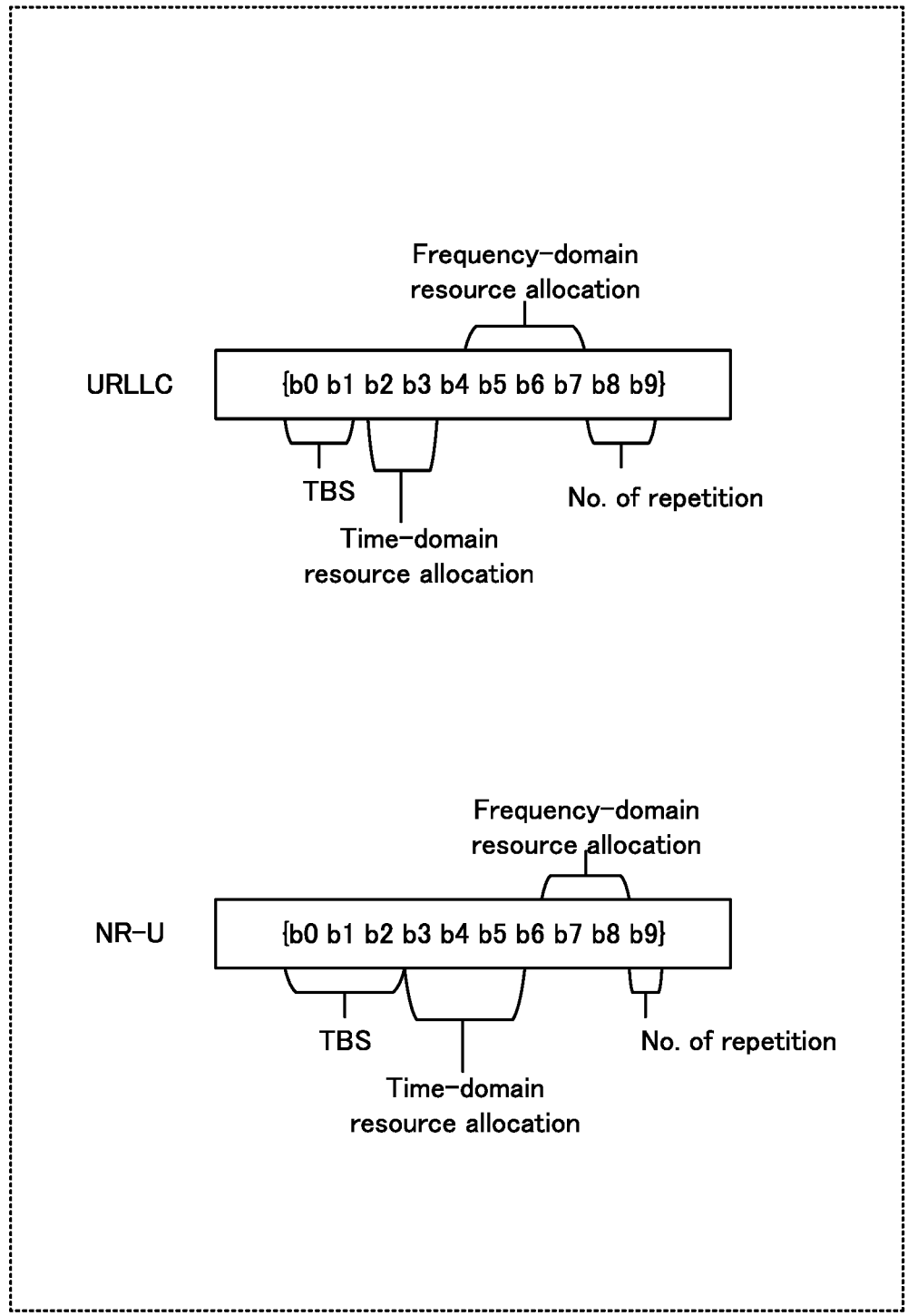
FIG. 11 is a diagram illustrating examples of UCI bit fields according to Embodiment 7.

As illustrated in FIG. 11, for example, the interpretation of a UCI bit field (10 bits of b0 to b9 in FIG. 11) may be changed for each use-case (e.g., URLLC or NR-U). For example, a large amount of frequency domain resource allocation and a large number of repetitions are assigned to URLLC as compared with NR-U in the UCI bit fields illustrated in FIG. 11. Meanwhile, a large TBS and a large amount of time domain resource allocation are assigned to NR-U as compared with URLLC in the UCI bit fields illustrated in FIG. 11.

The configuration relating to the interpretation of a bit field may be previously configured in terminal 200 by base station 100, using higher-layer indication, and/or several bits of a UCI may be used for indicating which interpretation of the bit field is used.

According to this embodiment, the designs of UCIs are unified regardless of use-cases, so that the reception processing of UCIs in base station 100 can be simplified. Moreover, according to this embodiment, the content (e.g., bit allocation for each piece of information in a UCI bit field) of a UCI is made different in accordance with the use-case. Thus, terminal 200 can indicate a parameter appropriate to the use-case to base station 100.

Each embodiment of the present disclosure has been described thus far.

Note that, in the embodiments described above, the use-cases are not limited to URLLC, and these embodiments can be applied to any use-case which uses UL grant-free transmission. Examples of use-cases which use UL grant-free transmission include NR using an unlicensed band, and a system, such as Non-orthogonal Multiple Access (NOMA).

Further, the transmission method performed, together with UL data transmission, by including, information relating to the corresponding UL data transmission in a UCI, is not limited to grant-free transmission, and may be grant-base UL transmission. For example, in NR using an unlicensed band, a resource for UL transmission is allocated to a terminal from a base station by a DCI. There is, however, a possibility that transmission may be performed using a part of the resource actually allocated from the base station as a result of performing Listen Before Talk (LBT) in the terminal side, for example. In this case, terminal 200 may include, in a UCI, information relating to the actual used resource from among the resource allocated by base station 100 and information relating to a TBS and/or the like, and indicate the pieces of information to base station 100 according to an aspect of the present disclosure.

Moreover, in the embodiments, the transmission method performed by including the information relating to data transmission in a UCI can be applied to a side link, such as V2X.

Moreover, in the embodiments described above, the case has been described where terminal 200 selects one combination from among combinations (e.g., see FIG. 5, FIG. 6, or FIG. 8) of a plurality of parameters shared between base station 100 and terminal 200, and performs a UL grant-free transmission based on the selected combination. It is, however, not limited to this case, and terminal 200 may perform a UL grant-free transmission using parameters in accordance with the data traffic amount without sharing of combinations of a plurality of parameters or the like between base station 100 and terminal 200 in advance, for example.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

A terminal of the present disclosure includes: control circuitry, which, in operation, dynamically determines one or more parameters relating to transmission of uplink data; and transmission circuitry, which, in operation, transmits, to a base station, uplink control information indicating the determined one or more parameters.

In the terminal of the present disclosure: the terminal is a terminal, which in operation, transmits the uplink data without dynamic allocation from the base station, the control circuitry selects one combination from among a plurality of combinations of the one or more parameters, the plurality of combinations being shared between the base station and the terminal, and the transmission circuitry transmits the uplink data, using the one or more parameters corresponding to the selected combination.

In the terminal of the present disclosure, the uplink control information includes identification information indicating the selected combination.

In the terminal of the present disclosure: each of the one or more parameters is an absolute value, or a relative value with respect to a predetermined value.

In the terminal of the present disclosure: the one or more parameters include both or any one of a transport block size and a modulation and coding scheme (MCS).

In the terminal of the present disclosure: the one or more parameters include at least one of a transport block size and a radio resource.

In the terminal of the present disclosure: the terminal is a terminal, which in operation, performs uplink transmission for transmitting the uplink data without dynamic allocation from the base station, the control circuitry selects one configuration from among a plurality of configurations of the uplink transmission, the plurality of configurations being shared between the base station and the terminal, and the transmission circuitry performs the uplink transmission based on the one or more parameters corresponding to the selected configuration.

In the terminal of the present disclosure: in a case where a same resource is allocated in the plurality of configurations, the uplink control information includes identification information indicating the selected configuration, and in a case where a different resource is allocated in the plurality of configurations, the uplink control information does not include the identification information.

In the terminal of the present disclosure, the control circuitry selects any of the plurality of configurations for each of a plurality of transmission timings at which repetition is applied in the uplink transmission.

In the terminal of the present disclosure, the control circuitry selects any of the plurality of configurations for each of a plurality of blocks resulting from division of the uplink data.

In the terminal of the present disclosure, the uplink control information includes identification information of the terminal.

In the terminal of the present disclosure, the uplink control information includes information relating to a priority of the transmission of the uplink data.

In the terminal of the present disclosure, the transmission circuitry transmits the uplink control information, using an uplink control channel.

In the terminal of the present disclosure, the transmission circuitry multiplexes the uplink control information with an uplink data channel and transmits the uplink control information.

In the terminal of the present disclosure, a repetition configuration differs between the uplink data and the uplink control information.

In the terminal of the present disclosure, at least one candidate among a plurality of candidates for the one or more parameters is a value common to a plurality of the terminals.

In the terminal of the present disclosure, designs of the uplink control information are unified regardless of use-cases.

In the terminal of the present disclosure: the designs are bit sizes of the uplink control information, and a bit allocation of information relating to the one or more parameters in the uplink control information in which the bit sizes have been unified differs for each of the use cases.

A communication method of the present disclosure includes: dynamically determining one or more parameters relating to transmission of uplink data; and transmitting, to a base station, uplink control information indicating the determined one or more parameters.

INDUSTRIAL APPLICABILITY

An aspect of the present disclosure is useful in mobile communication systems.

REFERENCE SIGNS LIST

100 Base station
101, 209 Controller
102 Higher-layer control signal generator
103, 106, 210, 212 Encoder
104, 107, 211, 213 Modulator
105 DL control signal generator
108, 214 Signal assigner
109, 215 IFFT processor
110, 216 Transmitter
111, 201 Antenna
112, 202 Receiver
113, 203 FFT processor
114, 204 Extractor
115, 117 Demodulator
116, 118, 206, 208 Decoder
119 Determiner
200 Terminal
205 DL control signal demodulator
207 Higher-layer control signal demodulator

The invention claimed is:

1. A terminal, comprising:
control circuitry, which, in operation, selects a set of parameters relating to transmission of uplink data, the set being selected, from among plural sets which are indexed to correspond to plural semi-static configurations of uplink grant-free transmission having configuration IDs and are shared between the terminal and a base station, the plural sets each including a parameter relating to a radio resource and a parameter relating to one or both of a transport block size (TBS) and a modulation and coding scheme (MCS); and
transmission circuitry, which, in operation,
transmits, to the base station, uplink control information which indicates an index of the selected set of parameters, the uplink control information indicating a configuration ID of a semi-static configuration of uplink grant-free transmission corresponding to the index and including priority information of the uplink data, and
transmits, to the base station, the uplink data using the selected set of parameters without using dynamic allocation from the base station.

2. The terminal according to claim 1, wherein the uplink control information includes identification information indicating the selected set of parameters.

3. The terminal according to claim 1, wherein each of the parameters in the selected set of parameters is an absolute value, or a relative value with respect to a predetermined value.

4. The terminal according to claim 1, wherein:
the control circuitry, in operation, selects a semi-static configuration of uplink grant-free transmission from among a plurality of configurations for uplink transmission which are shared between the terminal and the base station, wherein the selected set of parameters correspond to the selected semi-static configuration of uplink grant-free transmission.

5. The terminal according to claim 4, wherein:
in a case where the same resource is allocated in the plurality of configurations, the uplink control information includes identification information indicating the selected semi-static configuration of uplink grant-free transmission, and
in a case where different resources are allocated in the plurality of configurations, the uplink control information does not include the identification information.

6. The terminal according to claim 4, wherein the control circuitry, in operation, selects any of the plurality of configurations for each of a plurality of transmission timings at which the uplink transmission is repeated.

7. The terminal according to claim 4, wherein the control circuitry, in operation, selects any of the plurality of configurations for each of a plurality of blocks resulting from division of the uplink data.

8. The terminal according to claim 1, wherein the uplink control information includes identification information of the terminal.

9. The terminal according to claim 1, wherein the transmission circuitry, in operation, transmits the uplink control information using an uplink control channel.

10. The terminal according to claim 1, wherein the transmission circuitry, in operation, multiplexes the uplink control information with an uplink data channel.

11. The terminal according to claim 1, wherein a repetition configuration differs between the uplink data and the uplink control information.

12. The terminal according to claim 1, wherein the parameters in the selected set of parameters include at least one parameter value common to a plurality of terminals.

13. The terminal according to claim 1, wherein the uplink control information has a unified design for different use cases.

14. The terminal according to claim 13, wherein:
the unified design is defined by a bit size of the uplink control information, and
a bit allocation of information relating to the selected set of parameters differs for each of the different use cases.

15. A communication method performed by a terminal, comprising:
selecting a set of parameters relating to transmission of uplink data, the set being selected, from among plural sets which are indexed to correspond to plural semi-static configurations of uplink grant-free transmission having configuration IDs and are shared between the terminal and a base station, the plural sets each including a parameter relating to a radio resource and a parameter relating to one or both of a transport block size (TBS) and a modulation and coding scheme (MCS);
transmitting, to the base station, uplink control information which indicates an index of the selected set of parameters, the uplink control information indicating a configuration ID of a semi-static configuration of uplink grant-free transmission corresponding to the index and including priority information of the uplink data; and
transmitting, to the base station, the uplink data using the selected set of parameters without using dynamic allocation from the base station.

* * * * *